UNITED STATES PATENT OFFICE.

JULIUS A. REICH, OF VIENNA, AUSTRIA-HUNGARY.

FLUORIN COMPOUND AND METHOD OF MAKING SAME.

SPECIFICATION forming part of Letters Patent No. 676,548, dated June 18, 1901.

Application filed December 20, 1897. Serial No. 662,716. (No specimens.)

*To all whom it may concern:*

Be it known that I, JULIUS A. REICH, a subject of the Emperor of Austria-Hungary, residing at Czerningasse 3, Vienna, Austria-Hungary, have invented certain new and useful Improvements in Processes of Transforming Silico-Fluorids and Boro-Fluorids into Corresponding Fluorids or Fluorin Compounds, of which the following is such a full, clear, and exact description as will enable any one skilled in the art to which it appertains to make and use the same.

This invention consists of a process for preparing out of silico-fluorids and boro-fluorids the corresponding fluorids which may be used as such or for the preparation of other products.

Prior to my invention no process was known for transforming silico-fluorids and also boro-fluorids into the corresponding fluorin compounds with ease and completeness, particularly not on the large scale suitable for manufacturing purposes. If, for instance, an alkaline silico-fluorid is ignited in order to drive out the silicon-fluorid, so as to subsequently obtain the remaining alkaline fluorid, (this method has already been proposed and tried several times,) a part of the silicon fluorid readily separates in the form of a gas, and for this purpose a comparatively low temperature suffices; but in order to completely separate all the silicon fluorid present in combination long-continued and very strong ignition is necessary, and then the remaining substance will always contain some silico-fluorid, (quoted from Lunge, *Handbook of Soda Manufacture*, 3d volume, latest edition, "Manufacture of Soda out of Sodium Silico-Fluoride.") It may be further observed that the complete removal of the silicon fluorid in order to obtain a fluorid for further use and application is not practicable as a manufacturing process, for at the high temperature necessary the vessels and furnaces are strongly attacked not only by the silicon fluorid evolved, but also and to a much more considerable extent by the alkaline fluorid, which fuses at that high temperature. No material is available that would resist these influences for even a short time. A further point is that in consequence of this strong action on the material of the containing vessels (in which the fusion takes place) the fluorid produced would be very impure and of much reduced value. Attempts which have been made to produce by a wet process the corresponding fluorids from the silico-fluorids have also resulted in failure. If, for instance, an alkaline silico-fluorid is boiled with a solution of caustic alkali or milk of lime, a reaction does certainly take place, but with difficulty and not completely. In the first place alkaline silico-fluorid (and also most of the other silico-fluorids) is difficultly soluble, which makes a double decomposition with other substances much more difficult. In the second place the reaction is impeded still further by the silicic acid, which is separated at the time in the gelatinous form. Hence the boiling solution becomes very viscous and thick, which materially impedes the boiling process and makes it impossible except at a prohibitive cost to wash out from the very voluminous precipitates the soluble products formed. All the above disadvantages occur to a less or greater extent not only in the case of silico-fluorids, but also in that of boro-fluorids. This invention now proposes to do away with these disadvantages, not only in the case of silico-fluorids, but also in that of boro-fluorids, and everything that has been stated and will be stated later on in this specification about the former equally applies to the latter. Now as the preparation of fluorids from the corresponding silico-fluorids and boro-fluorids by the processes described is either impossible on a manufacturing scale or impracticable on account of prohibitive cost, in my invention (based on numerous experiments) the desired reaction is produced by heating the silico-fluorid or boro-fluorid which is to be treated with an oxid of one of the metals of the alkaline earths—for instance, calcium oxid, barium oxid, strontium oxid, or magnesium oxid. As an example to show how the invention is worked out I will describe the treatment of alkaline silico-fluorid.

The experiments made show that if a mixture of an alkaline silico-fluorid with an alkaline earth—for instance, lime—be heated to a low red heat no silicon fluorid is evolved; but a mass is left from which all the alkaline fluorid can be extracted by washing with water. If, for instance, an alkaline silico-fluorid, ($A_2SiF_6$,) where A represents an alkaline metal, is well mixed with lime in the proportion of, say, one molecule of the former to three molecules of the latter and gently heated in a crucible or reverberatory furnace to a low red heat, and as soon as any part of the mixture reaches that temperature a sudden intense ignition takes place there. This spreads rapidly through the mass, even if no further external heat be supplied, so that the whole of it, which till then was only black hot becomes of a bright-red heat. The reaction takes place so vigorously that it looks as if the whole mass was being consumed like glowing tinder. This appearance is particularly noticeable if as soon as it commences all external supply of heat is cut off. The undisturbed progress of the phenomenon in question may then be readily observed. The reaction described above can be explained by the following chemical equation—namely, $A_2SiF_6 + 3EAO = 2AF + 2EAF_2 + EASiO_3$. In this equation A signifies an alkali base—for instance, Na, K, &c.—and EA signifies an earth alkaline base, such as Ba, Ca, Mg, &c. Where Ca forms the earth alkaline base in the above-noted equation, the following is obtained—namely, $A_2SiF_6 + 3CaO = A_2F_2 + (CaSiO_3 2CaF_2$.) This chemical product, from which the fluorid has been separated by treating with water, represents a new substance of a hitherto-unknown composition and is in a certain measure the simultaneous second final product of this process by which this fluorid is produced. This product possesses the chemical quality, hitherto unknown, of generating through treatment with acids, hydrofluorsilicic acid and allows the regeneration of the hydrofluorsilicic acid. The circumstance that the reaction, if once started, can supply its own heat is in these cases of importance from the manufacturing point of view, since it makes it possible to carry out the whole chemical process by supplying heat only till the reaction commences. If heat were supplied after the reaction had commenced, the whole mass would be fused by the raised temperature, whereby the sides of the crucibles and furnaces, as already mentioned above, would be attacked and the mass itself would suffer from the addition of a considerable amount of impurity. In order to prevent this in practice, it is advisable to employ a larger proportion of the metallic oxid than the molecular proportion given above in order to prevent the mass from fusing together, or to add an indifferent body, as diluent, to prevent the mass from fusing together—for instance, difficultly-fusible powdered minerals, such as feldspar, fluorids of the metals of the alkaline earths, &c. The ignited mass may in any case contain, in order to prevent it from caking too much, a difficultly-fusible body, such as a silicate, an aluminate, &c., or a metallic oxid which resists heat and is insoluble in water, such as zinc oxid, ferric oxid, &c.

The reaction takes place without any evolution of gas, as no silicon fluorid is separated. The opposite is the case with an alkaline silico-fluorid when ignited by itself. This non-production of silicon fluorid is of importance, as the production or escape of this gas (which is difficult to condense) would be very objectionable from the manufacturing point of view, and at the same time it would necessarily lead to considerable losses (not to be avoided) of the materials used for regenerating hydrogen silico-fluorid. When the reaction has been completed, the mass, which after ignition is somewhat caked together, is powdered and treated with water. A strongly-alkaline pure lye is obtained. In it there is no dissolved alkaline earth (in this case no dissolved lime) to be found; but all the alkali contained in the alkaline silico-fluorid is dissolved in it in the form of alkaline fluorid. This alkaline fluorid may be transformed, for instance, by lime, into caustic alkali. The caustic alkali may also be obtained by using the necessary excess of lime added to the mixture before ignition. The solution obtained will then contain caustic alkali and no alkaline fluorid.

If the solution of alkaline fluorid obtained from the ignited mass is to be transformed into a caustic lye or a carbonate one by boiling with milk of lime, &c., then calcium fluorid is separated, which may be used by itself for the reproduction of hydrogen silico-fluorid or of alkaline silico-fluorid or together with the other residue.

If, as already mentioned above, the caustic alkali or the alkali carbonate is to be obtained directly in the ignition process from the alkaline fluorid formed in it, this is done, as already mentioned, by increasing the amount of alkaline earth, (oxid of metal of an alkaline earth or material producing it)—for instance, by using an excess of quicklime or of a mixture of calcium carbonate and carbon. In that case, which, however, necessitates the supply of external heat to be considerably increased, the alkaline fluorid is first formed in the process of the reaction during ignition and this, by a secondary reaction, is transformed into caustic alkali or alkaline carbonate, which may then be extracted by water.

It is self-evident that mixtures can be used which contain oxids of alkaline earth, metals, or mixtures of silico-fluorids or boro-fluorids, with the given alkaline earths or mixtures of them, for the purposes of the reaction.

It may be here remarked that according to the experiments made the oxids only (especially of the alkaline earth metals) give the above-described reaction which is strongly exothermic and are therefore specially suited for the practical carrying out of the process in question; but a saving of oxids may be effected if in the mixture of silico-fluorid and oxid a part of the oxid is replaced by material which contains such oxids, either singly or collectively, or else is capable of forming the oxids at the temperature employed—such as, for instance, calcic carbonate, calcic carbonate with carbon and nitrates; also, aluminates of the alkaline earths or carbids. The heat of the reaction produced by the alkaline earth present is then utilized, so that, for instance, added carbonate of an alkaline earth is transformed by it into oxid. It is evident, on the other hand, that economy of oxid necessitates a considerably greater supply of external heat in order to complete the reaction, as the heat produced in the reaction is used up for the decomposition (in the instance given of a carbonate of an alkaline earth) of material, and fresh heat must be supplied to the freshly-formed oxid in order to enable it to itself take part in the reaction.

The described compounds—such as the carbonates, nitrates, and other oxy salts of the alkaline earths—as they do not react by themselves, much less exothermically, can consequently generally be used only together with oxids of the metals of the alkaline earths, as described. It is better practically to replace by them excess of oxid, which serves to prevent fusion, or to transform the alkaline fluorid formed into caustic alkali. In that case the excess of heat formed during the reaction is practically employed to advantage.

An addition of carbon to the mixture in all cases has an advantageous effect on the commencement of the reaction. It is specially recommended when a part of the oxid of the alkaline-earth metal is substituted by one of the proposed alkaline-earth compounds, so as to assist in the reduction of the latter to oxid—for instance, to remove the carbonic acid from a carbonate.

In certain cases the progress of the reaction may be accelerated by the addition of alumina or silica to the mixture.

Having thus described my invention, what I claim, and desire to secure by Letters Patent, is—

1. The herein-described process of converting silico-fluorids into corresponding fluorids which consists in dry-heating the silico-fluorids together with an oxid of one of the metals of the alkaline earths, substantially as and for the purpose set forth.

2. The herein-described process of converting fluorid compounds consisting of fluorin and another metalloid combined with an alkaline metal into corresponding fluorids which consists in dry-heating the fluorid compound together with an oxid of one of the metals of the alkaline earths, and then treating the mass with water, substantially as and for the purpose set forth.

3. The herein-described process of converting fluorid compounds consisting of fluorin and another metalloid combined with an alkaline metal into corresponding fluorids which consists in dry-heating the fluorid compound together with dry caustic lime, substantially as and for the purpose set forth.

4. The herein-described process of converting fluorid compounds consisting of fluorin and another metalloid combined with an alkaline metal into corresponding fluorids which consists in dry-heating the fluorid compound together with an excess of metallic oxid in the proportions of not less than one molecule of the fluorid to three molecules of the metallic oxid, substantially as and for the purpose set forth.

5. The herein-described process of converting fluorid compounds consisting of fluorin and another metalloid combined with an alkaline metal into corresponding fluorids which consists in dry-heating the fluorid compound together with an oxid of one of the metals of the alkaline earths and adding thereto a difficultly-fusible body, substantially as and for the purpose set forth.

6. The herein-described process of converting fluorid compounds into corresponding fluorids which consists in dry-heating the fluorid compound together with an oxid of one of the metals of the alkaline earths until the mass ignites, and then discontinuing the supply of heat and allowing the ignition to continue, substantially as and for the purpose set forth.

7. The herein-described process of converting silico-fluorids into corresponding fluorids which consists in dry-heating the silico-fluorid with dry caustic lime until the mass ignites, and then discontinuing the heat and permitting the ignition to continue, substantially as and for the purpose set forth.

8. As a new article of manufacture, a fused compound consisting of an alkaline earth, silicon, fluorin and oxygen which is characterized by the property of generating hydrofluorsilicic acid when treated with acids, substantially as described.

In testimony whereof I have hereunto set my hand, this 4th day of December, 1897, in presence of the two subscribing witnesses.

JULIUS A. REICH.

Witnesses:
ALFRED REICH,
THEO. FRIEDRICH.